US004001756B2

United States Statutory Invention Registration [19]

[11] Reg. Number: H1756

Lohrmann

[45] Published: Nov. 3, 1998

[54] APPARATUS AND PROCESS FOR MEASURING THE GRADIENT OF REFRACTIVITY OF A GAS

[76] Inventor: Dieter R. Lohrmann, 1013 Stone Ave., Waldorf, Md. 20602

[21] Appl. No.: 852,882

[22] Filed: Mar. 12, 1997

[51] Int. Cl.[6] ..... G01N 29/02

[52] U.S. Cl. ..... 73/24.01; 73/23.2

*Primary Examiner*—Bernarr E. Gregory

[57] ABSTRACT

A differential refractometer measures the difference of refractive index of electromagnetic centimeter waves of samples of gas with high sensitivity, and can be used to measure the gradient of refractive index of electromagnetic waves in air, and more particularly, to measure radar ducting conditions low over bodies of water. The instrument uses two microwave oscillators, each with its own frequency controlling cavity, with the frequencies of the oscillators differing by a specific value. Air from each of two intakes, vertically separated a specific distance, is directed into each cavity, and the difference frequency measured for a short time, to provide a first measured difference frequency. Then, the air flow from the intakes are cross-fed to the cavities, and the difference frequency is measured for a short time to provide a second measured difference frequency. The difference of refractive index of the air flowing through the intakes is proportional to the difference between the measured difference frequencies. Subsequently, the flow of air through the cavities is alternated periodically, at a rate of about 10 Hz. The drift of the oscillators is mostly eliminated by this method since there is very little frequency drift within the short measurement time.

22 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

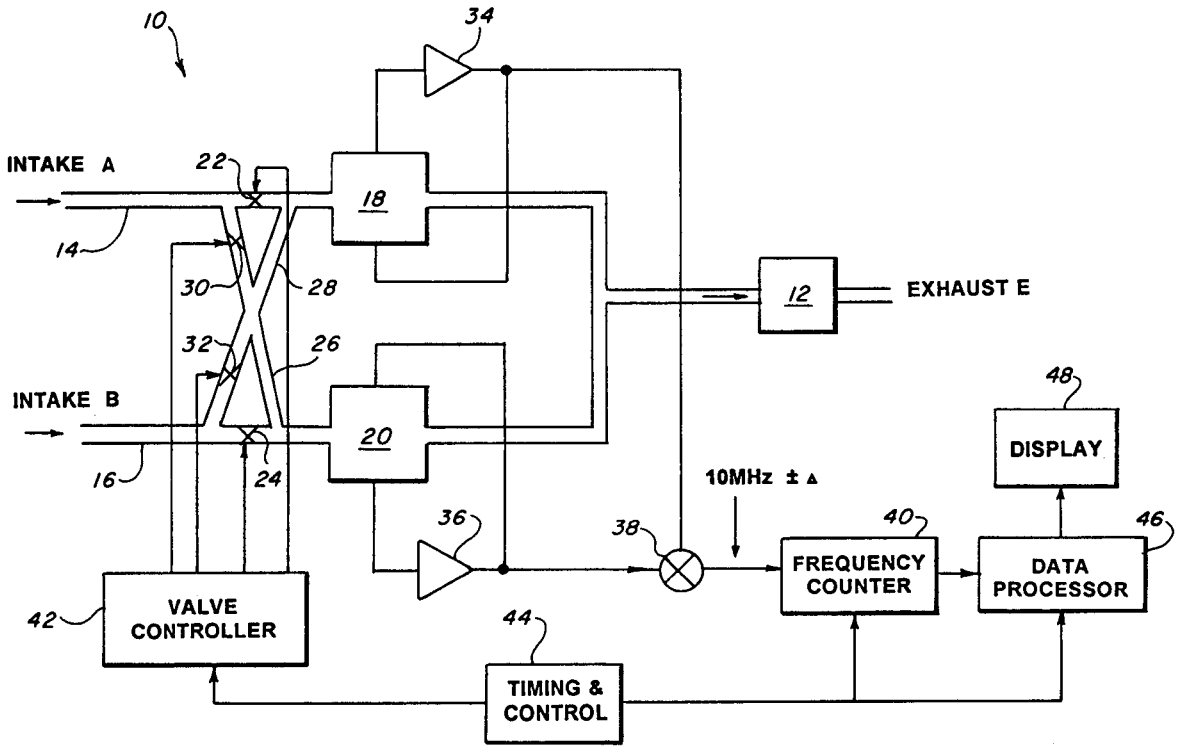

APPARATUS AND PROCESS FOR MEASURING THE GRADIENT OF REFRACTIVITY OF A GAS

BACKGROUND OF THE INVENTION

1. Field of the Invention

The present invention relates generally to the determination of the refractive index of a gas, and more particularly to an apparatus for measuring such index. More specifically, the invention relates to an apparatus and process for measuring the refractive index of a gas such as air, and determining the gradient of the refractivity of the gas.

2. Background

It is well known that energy at microwave frequencies are bent by variations in the index of refraction of the atmosphere. This bending is determined by the changes or gradients in refractivity along the path of the energy propagation and by the angle of penetration of the energy rays. Refractive bending effects are most pronounced at small angles to the horizontal.

The U.S. Navy has an interest in predicting ducting conditions over the ocean for radar and microwave/millimeter wave communications purposes. Surface ducts over the sea exist when the refractive index for radio waves decreases with height, bending the waves down towards the sea surface. If the refractive index decreases by −1.57 E-7 per meter height, then the waves just follow the curvature of the earth and an "evaporation duct" exists over the surface of the ocean. Under such condition, ship board radars can "see" far beyond the horizon, and microwave and millimeter wave communications exhibit excessive ranges. Further ducting causes elevation tracking errors of radars, which can be accounted for and reduced if the ducting conditions are known.

At present ducting conditions are predicted by measuring sea temperature, air temperature and wind speed over the ocean. Since these parameters do not always correctly describe the gradient of refractivity of the air over the ocean, occasionally very wrong predictions result.

To measure the index of refractivity versus height over the ocean is very difficult due to the very small variations of the index versus height that need to be measured, and the strong fluctuation of that index with time.

3. Related Art

In the past, microwave refractometers have been used to measure the index of refraction of the atmosphere. The resonant frequency of a resonant cavity depends on the index of refraction of the gas therein, so that determination of this frequency permits determination of the index of refraction. A known type of refractometer uses two resonant cavities, one of which is sealed to provide a reference cavity and the other of which is open to the atmosphere to be sampled. The resonant frequencies of the two cavities were compared to determine the index of refraction of the sampled gas. Examples of uses of this technique are described in U.S. patents. Thus, in the patents to Everman (U.S. Pat. No. 3,356,941) and Parlanti et al. (U.S. Pat. No. 3,323,044), the refractive index of a sample gas in an open cavity is measured and compared with a reference gas in a closed cavity. The device in Sargent et al. (U.S. Pat. No. 2,964,703) measures the change in refractive index to calculate the water vapor pressure or humidity. In Schofield (U.S. Pat. No. 4,104,585), the concentration of impurities in liquids is measured, wherein the output frequencies of the resonators are mixed to derive a difference frequency dependent on the difference in concentration of particles in the test and reference samples.

The prior art also shows the use of a single open cavity for sampling the gas. Heile (U.S. Pat. No. 3,601,695) uses two microwave frequency sources with one sampling cavity, and the resonant frequency is converted to a signal representative of the refractive index of air, and in Heile (U.S. Pat. No. 4,027,237), a harmonic of a low frequency sweep oscillator is phase locked to the microwave sampling cavity, with the output providing a direct measurement of refractivity. Thompson et al. (U.S. Pat. No. 3,400,330) uses a single multimode resonant cavity in which a gas sample is placed and simultaneously excited at the fundamental and the harmonic modes. The difference in phase between the output signals of the two modes is used to determine the difference in refractive index at the two frequencies. In Thompson (U.S. Pat. No. 3,898,558), the output signal varies as a linear function of the refractive index of the sampled gas.

However, the same effect which causes the change in frequency also causes the change in propagation conditions such as radar ducting low over the ocean. Also, all these schemes have a common problem since the short and long term frequency drift of the oscillator during the required long time of integration is usually much greater than the effect to be measured, thus making measurements with the required accuracy difficult or impossible.

Direct measurement of the gradient of refractive index at low altitudes over the ocean in order to predict radar ducting conditions traditionally has been difficult because the modified index of refractivity, M, which typically is equal to 300, has large fluctuations over time, whereas a tiny change of this factor of −0.16 per meter height is indicative of ducting conditions. Therefore, relatively long integration times are required in order to average out the fluctuations and to measure small changes of refractive index versus height.

SUMMARY OF THE INVENTION

The present invention proceeds from the observation that what needs to be measured is not the refractive index versus height per se, but only its variation, or the gradient, versus height. Thus, samples of air are taken quasi-simultaneously at two heights which differ by a small, know increment, e.g., 1 meter, to reduce the effects of random oscillator frequency drift. The refractive indices of these two samples are measured and subtracted from each other, resulting in the gradient for a one-meter height increment. Many such measurements then are taken per second, and the results averaged over several seconds in order to average out the fluctuations. The result is the gradient at that height. The process is repeated at different heights to provide an entire profile of the gradient for specific heights, for example, from 1 to 20 meters. With these data, the effects of the refractive index variation can be determined more accurately and predictions of ducting conditions can be made more precisely.

An apparatus to measure this gradient of refractivity for research and practical use at sea includes two air intakes, vertically separated by a known distance, each of which can be alternately placed in fluid communication with one of two resonant cavities within the instrument. Air from each intake is introduced into each cavity and the difference frequency measured for a short, specified time, e.g., 35 ms, resulting in a first measured difference frequency $\delta f_A$. Then, the air intakes are cross-coupled with the cavities. That is, if intake A had been coupled to cavity 1, is now coupled to cavity 2, and similarly for intake B. Again, the difference frequency is measured for a short, specified time, resulting in a second measured difference frequency $\delta f_B$. The difference of refractive index of the air flowing through intake A and intake B is proportional to the difference between the measured difference frequencies $\delta f_A$ and $\delta f_B$. Subsequently, the flow of air through the cavities is alternated periodically, at a rate of about 10 Hz. The drift of the oscillators is mostly eliminated by this method since there is very little frequency drift within the short measurement time.

DESCRIPTION OF THE PREFERRED EMBODIMENT

Figure 1:
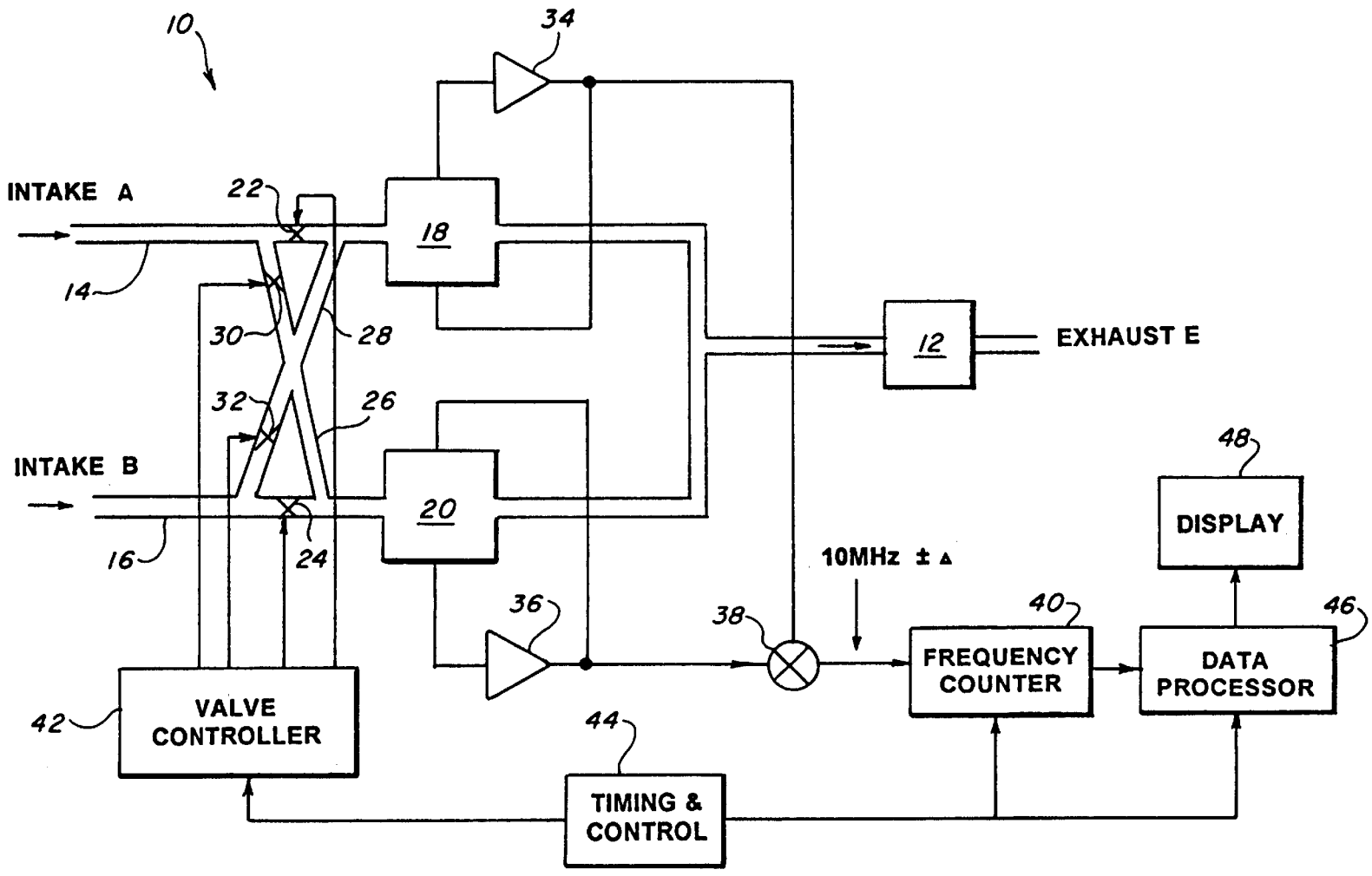
FIG. 1 shows a block diagram of the gradient air refractometer according to the present invention.

FIG. 1 shows a functional block diagram of an embodiment of a gradient air refractometer, or differential refractometer, according to the present invention, indicated generally by the reference numeral 10. A pump 12 pulls air into the apparatus 10 through intakes A and B, through conduits or flow passages 14 and 16, and through two, separate high Q microwave cavities 18 and 20, which function as the frequency controlling elements of the microwave oscillators. In order to minimize frequency drift, the oscillator cavities 18 and 20 preferably are made of Invar steel which has a thermal expansion coefficient close to zero. The interior of each cavity 18 and 20 is plated with silver, gold or copper to achieve a high Q-factor. Air intakes A and B are at heights that differ by a specific increment $\Delta h$, e.g. 1 meter, with intake A for example being positioned above intake B. Flow through the conduits 14 and 16 is controlled, respectively, by valves 22 and 24. The conduits 14 and 16 are interconnected by cross-flow conduits or passages 26 and 28 to permit flow through each of the cavities 18 and 20 alternately from intake A and intake B, by selective operation of valves 30 and 32 located, respectively, in the cross-flow conduits 26 and 28. The air is discharged from the apparatus 10 through an exhaust E. Microwave amplifiers 34 and 36, coupled respectively to the cavities 18 and 20, provide the gain elements in the oscillator feedback loops in known fashion. Microwave oscillator cavity 18 is tuned to a specific frequency $f_1$, for example 10.01 Ghz, and oscillator cavity 20 is tuned to a frequency $f_2$ very close to that of cavity 18, for example, 10 MHZ below $f_1$, or 10 GHz. Both frequencies are mixed in a mixer 38, resulting in a 10 MHz difference frequency, which is measured by a frequency counter 40.

Actuation of the valves 22, 24, 30 and 32 is controlled by a valve control means 42. Operation of the refractometer 10 is controlled by a timing and control means 44 which also is operatively connected to the frequency counter 40, a data processor 46 and a display 48. If desired, the data processor and the display may be devices separate from the refractometer itself to enhance compactness and portability of the apparatus. The output of the refractometer then may be coupled to a separate data processor and a display.

At the beginning of a measuring cycle, valves 22 and 24 are open and valves 30 and 32 closed. Air from intake A then flows through oscillator cavity 18, resulting in a frequency change of $\delta f_A$ in the cavity, the change being related to the refractive index of the air sample from intake A, and air from intake B flows through oscillator cavity 20, resulting in a frequency change in the cavity of $\delta f_B$ which is related to the refractive index of the air sample from intake B. The changes in resonance frequency $\delta f_A$ and $\delta f_B$ do not depend on $f_1$ or $f_2$. When the air flow to cavities 18 and 20 are reversed, $\delta f_A$ and $\delta f_B$ remain the same, but are felt in opposite cavities. The frequency measured by the frequency counter 40 is determined as:

$$f_{C1}=(f_1-\delta f_A)-(f_2-\delta f_B)$$

with the resulting number representing $f_{C1}$ being stored in the data processor 46.

Then timing and control means 44, through valve control means 42, closes the valves 22 and 24 and opens the valves 30 and 32. Now air from intake A flows through cavity 20, causing a frequency change $\delta f_A$ in the cavity, and air from air intake B flows through cavity 18, causing a frequency change in the cavity of $\delta f_B$. The frequency measured by the frequency counter 40 is determined as:

$$F_{C2}=(f_1-\delta f_B)-(f_2-\delta f_A)$$

with the resulting number representing $f_{C2}$ being sent to the data processor 46 and subtracted from $f_{C1}$, resulting in a frequency difference $\Delta f$:

$$\Delta f=(f_{C1}-f_{C2})=2(\delta f_B-\delta f_A)$$

The gradient g is then determined from the following expression, and stored in the data processor 46 for averaging:

$$g=\Delta f/(f_1+f_2)/\Delta h$$

The measuring cycle is repeated, with the valves 30 and 32 being closed and the valves 22 and 24 opened, resulting in a new measured value of g. The closing and opening of the valves are reversed, and measurements taken and a new value of g calculated; etc. Many such measured values of g are then averaged in the data processor 46 over several seconds of measuring time, and the resulting average value for the gradient g is displayed on the display 48.

The cycle time should be as short as possible, typically 10–100 ms, to minimize the effects of oscillator drift. Thus, between 10 to 100 values should be taken per second, and the values averaged over several seconds of measuring time.

Figure 2:
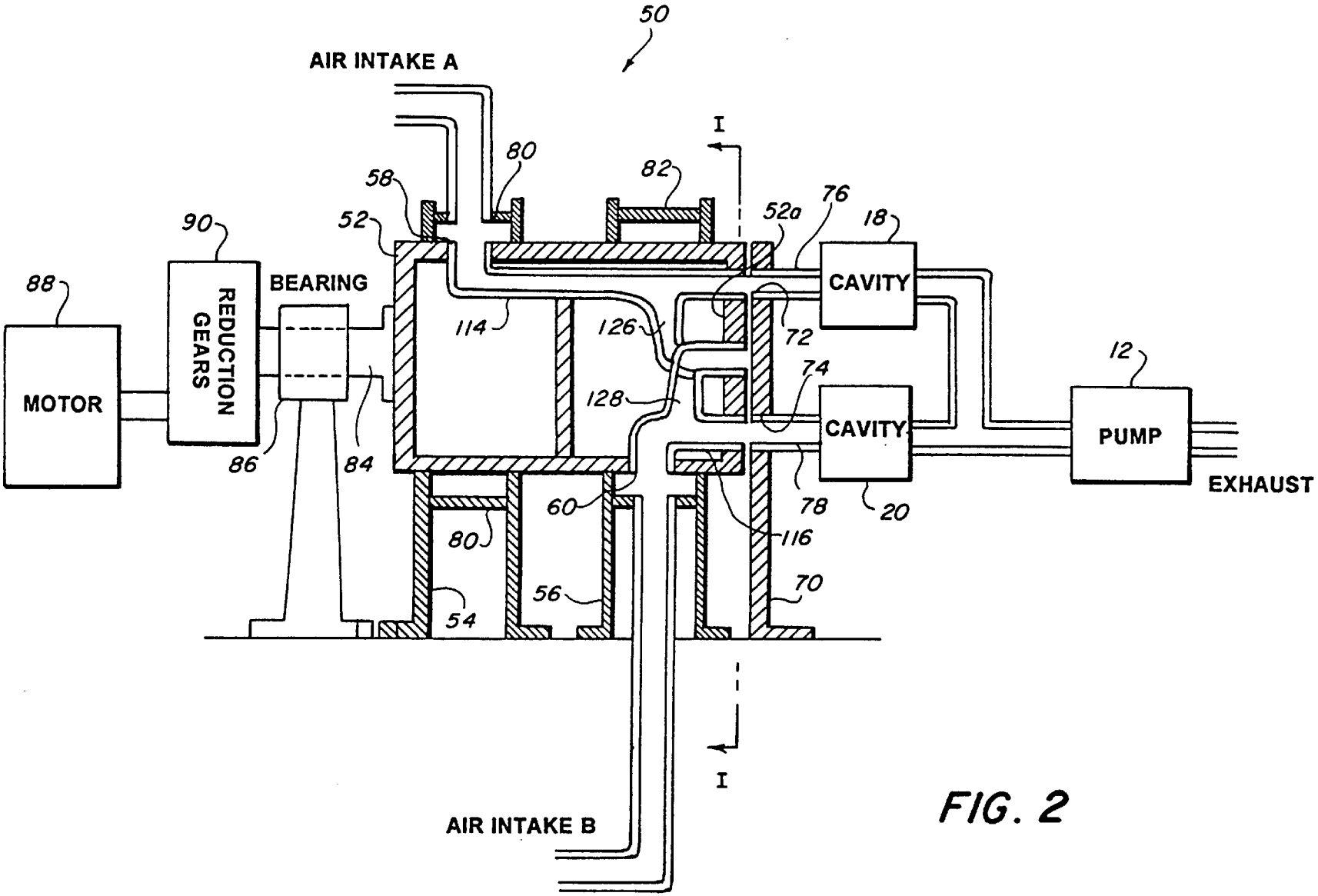
FIG. 2 shows an embodiment of a valve assembly used with the refractometer of FIG. 1.
Figure 3:
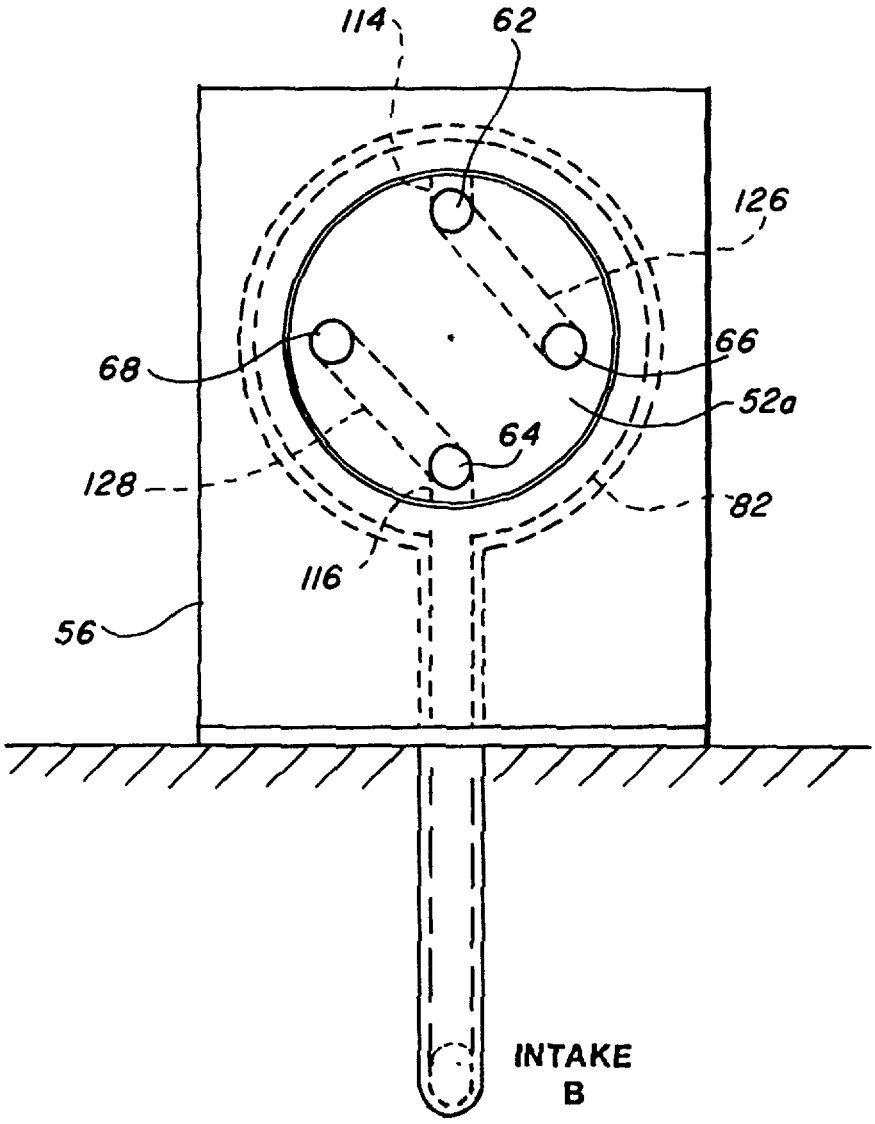
FIG. 3 is a view along section line I—I in FIG. 2.

This large number of measurements over a short period of time can cause a problem in the control of the valves 22, 24, 30 and 32, which have to react within milliseconds. In principle, an arrangement similar to automotive engine valves could be used. However, a better solution is illustrated in FIGS. 2 and 3, which show an embodiment of a mechanical rotary valve assembly 50 capable of operating as a quick-acting flow reversal switch. Using a 100-series set of reference characters to designate similar structural features described above for FIG. 1, valve assembly 50 includes a cylinder or drum 52 rotationally supported by shaft 84 and bearing 86. Near the closed ends of the cylinder 52, on diametrically-opposite sides, orifices or openings 53 and 60 are located to communicate with the intake A and intake B, respectively, during operation of the rotary valve assembly 50. As shown in FIG. 3, an end wall 52*a* of the cylinder 52 is provided with a set of four openings, spaced approximately 90° apart around the periphery, and identified clockwise as 62, 64, 66 and 68. A cover plate 70 is located adjacent to the cylinder end wall 52*a*, and has diametrically-disposed bores 72 and 74 through which coupling conduits 76 and 78, extend, respectively, to the oscillator cavities 18 and 20. The air pump 12 is connected to the cavities 18 and 20, and discharges air from the apparatus through the exhaust E.

A conduit or flow passage 114 inside the cylinder 52 couples the orifice 58 in the side of the cylinder and the opening 62 in the end wall 52*a*, and similarly a conduit or flow passage 116 couples the orifice 60 and the opening 64. A cross-flow conduit or passage 126 provides fluid communication between the orifice 58 and the opening 66 in the end wall 52*a* of the cylinder 52, and cross-flow conduit or passage 128 joins the orifice 60 and the opening 68. A toroidal shroud 80 is disposed exteriorly at one end of the cylinder 52 and provides constant fluid communication between the air intake A and the orifice 58 and the conduit 114 as the cylinder 52 is rotated. Similarly, a toroidal shroud 82 exteriorly surrounds the other end of the cylinder 52 and provides constant fluid communication between the air intake B and orifice 60 and the conduit 116. A small air gap separates each of the toroidal shrouds 80 and 82 from the surface of the cylinder 52 to prevent friction, and these gaps may be closed by felt or rubber seals to avoid leakage of ambient air into the cylinder 52. The toroidal shrouds conveniently may be incorporated as part of the cylinder supports means 54 and 56 for additional compact packaging of the gradient refractometer.

As shown in FIG. 2, the cylinder 52 can be rotated by a shaft 84 fixed to one end, supported by a bearing 86, and driven by a motor 88 through reduction gears 90. The cover plate 70, coupling conduits 76 and 78, toroidal shrouds 80 and 82, and the cavities 18 and 20 remain stationary.

In operation, the rotary valve assembly 50 functions as a very quick-acting air flow reversal switch, quickly directing the sampled air from intake A to either of the cavities 18 or 20, and from the intake B to either cavity, as determined by the timing and control means 44. Operation of the pump 12 causes a steady supply of sampled air drawn through the intake A to remain in the toroidal shroud 80, and a steady supply of air from intake B to remain in the shroud 82, providing a constant source of sampled air during operation of the differential refractometer. Pump 12 causes flow of the gas through the microwave cavities by suction. The gas can also be caused to flow through the cavities by positive pressure provided by pumps in conduits 14 and 16 in FIG. 1 (not shown). As the cylinder 52 is rotated, clockwise in FIG. 3 for example, into proper position by the motor 88, the opening 62 in the cylinder end wall 52*a* is aligned with the coupling conduit 76, permitting air to pass to the oscillator cavity 18 from the toroidal shroud 80, via the conduit 114. At the same time, the orifice 64 in the cylinder end wall 52 is aligned with the coupling conduit 78, thus permitting air to pass from the toroidal shroud 82, through the conduit 116 to the cavity 20. Also, at the same time, as can be seen from FIGS. 2 and 3, air from the shroud 80 is provided by the cross-flow conduit 126 to the orifice 66 in the cylinder end wall 52*a*. Likewise, air from the shroud 82 is provided to the orifice 68 by the cross-flow conduit 128. However, flow into either of the cavities 18 or 20 is blocked by the cover plate 70 since the orifices 66 and 68 are not in registry with the coupling conduits 76 and 78.

As the cylinder 52 is rotated further clockwise, air from the intake A and shroud 80 is passed through the cavity 20, and air from the intake B and shroud 82 through the cavity 18, by respective alignment of the orifice 66 with coupling conduit 78 and the orifice 68 with the coupling 76. With continued rotation of the cylinder 52, this process is repeated, providing sampled air from the intakes A and B alternately to the oscillator cavities 18 and 20 at a high speed.

Sensor means (not shown) of known design provide signals of the rotational position of the cylinder 52 to the frequency counter 40 and the data processor 46, to provide proper synchronism for the data processing. Also, while not shown or specifically described, valves would be provided in the air intakes A and B and operated to shut off further air flow into the apparatus while the pump is operated to purge air from the system before the refractometer is moved to a different height.

The above-described instrument is very sensitive and very stable. In tests performed with the instrument, the frequency drift was very low. With the air intakes blocked, and using a five-second integration time constant, the drift and noise of the refractive index were in the order of 1.0 E-8 over a period of 300 seconds.

Alternatively, instead of rotating the entire cylinder, some other provisions can be made to regulate air flow alternately to the oscillator cavities. For example, a circular valve plate (not shown) having appropriately-configured flow passages can be positioned between the cylinder end wall and the cover plate, and rotated to achieve the flow control described above.

The present invention may be embodied in other specific forms without departing from the spirit or essential characteristics thereof. Hence, the above disclosure of a preferred embodiment of the invention is intended to be illustrative, but not limiting, of the scope of the invention set forth in the following claims.

I claim:

1. An apparatus for measuring the vertical gradient of refractivity of a gas, comprising:

a first source and a second source for providing samples of the gas, said sources being vertically separated a known distance;

two resonant cavities for receiving samples of said gas, said cavities being tuned to different frequencies;

means for directing samples of gas from each of said sources to each of said cavities;

means for determining the difference frequency for each of said cavities, with gas samples from each of said sources; and processing means for determining the gradient of the refractive index for said gas for the separation distance of said sources.

2. An apparatus according to claim 1, wherein the means for directing samples of gas includes flow control means for alternately and intermittently directing gas samples from each of said sources to each of said cavities.

3. An apparatus according to claim 2, wherein the means for directing samples of gas includes flow passages interconnecting said sources and said cavities, and valve means in said flow passages which operate to alternately direct gas samples from each of said sources to each of said cavities.

4. An apparatus according to claim 2, wherein the means for directing samples of gas includes a rotatable member having flow passages which can, by rotation of said member, be placed in fluid communication between said sources and said cavities, to alternately and intermittently conduct gas samples from each of said sources to each of said cavities.

5. An apparatus according to claim 1, further including control means to regulate the overall operation of the apparatus.

6. A method for determining the vertical gradient of refractive index for a gas, comprising obtaining samples of the gas substantially simultaneously at two heights which differ by a small, known increment;

determining the refractive index of each of the two samples, including providing said gas samples to two, separate microwave oscillators, each of said oscillators having its own frequency controlling cavity, and determining the difference between the refractive indices; and determining the gradient by dividing the difference in refractive indices by the height at which said gas samples were obtained.

7. A method according to claim 6, including repeating the steps of claim 9 and averaging the values of refractive index gradient to average out fluctuations.

8. A method according to claim 7, further including repeating the method steps of claim 6 at different heights to provide a profile of the gradient for specific heights.

9. A method according to claim 6, wherein the step of providing the gas samples includes alternately providing gas samples from each of said two heights, to each of said oscillator cavities.

10. A method according to claim 9, wherein the step of alternately providing the gas samples to the oscillator cavities includes directing the flow of said gas samples through flow passages and selectively operating control valves in said flow passages.

11. A method according to claim 9, wherein the step of alternately providing the gas samples includes rotating a rotary flow switching device having flow passages which can, by rotation of said device, be placed in fluid communication with gas samples from said two heights and said cavities, to alternately and intermittently switch gas samples from each of said heights to each of said cavities.

12. An apparatus for measuring the gradient of refractivity of air, comprising:

two microwave oscillators, each having a resonant cavity as its frequency determining elements, said cavities being tuned to different frequencies;

two intakes spaced a predetermined distance apart, for providing sample air to each of said cavities;

flow control means connecting said intakes with said cavities to direct sample air from each of said intakes alternately to each of said cavities;

frequency mixing means coupled to said oscillators and providing as an output the difference between the frequencies provided by said oscillators;

frequency measuring device for receiving the output from said frequency mixing means; and data processing means for receiving the output from said frequency measuring device, and providing as output the gradient of refractivity for the air from said intakes.

13. An apparatus according to claim 12, further comprising timing and control means to control operation of said flow control means, frequency measuring device and data processing means.

14. An apparatus according to claim 13, wherein said flow control means comprises a pump, said pump is adapted to direct said sample air from each of said intakes alternately to each of said cavities either by suction or by pressure.

15. An apparatus according to claim 12, further comprising means for displaying the output of said data processing means.

16. An apparatus according to claim 12, wherein said data processing means operates to determine the difference of the frequencies interchangeably measured in said cavities and provided by said frequency measuring device, average the results and dividing the average by the sum of the cavity frequencies and the spacing distance of said intakes, to provide as output the gradient of refractivity.

17. An apparatus according to claim 12, wherein said flow control means includes flow conduits for providing air flow from each of said intakes to both of said cavities; and valve means disposed in said flow conduits and operable to intermittently interchange connection of said intakes to said cavities, such that the air flow from each of said intakes is alternately directed to each of said cavities.

18. An apparatus according to claim 12, wherein said flow control means includes a rotatable member having flow passages which can, by rotation of said member, be placed in fluid communiction between said intakes and said cavities, to alternately conduct air samples from each of said intakes to each of said cavities.

19. An apparatus according to claim 18, further including motive means to rotate said rotatable member, and timing and control means to synchronize rotation of said rotatable member and to control operation of said frequency measuring device and data processing means.

20. An apparatus according to claim 18, further including:

a plenum chamber for each of said intakes, to receive air from said intakes;

a plurality of orifices on one end of said rotatable member which can, by rotation of said member, be placed in fluid communication with said cavities; and obturating means disposed between said rotatable means and said cavities, and having conduits for fluid communication with each of said cavities, said flow passages are disposed within said rotatable member and interconnect said plenum chambers with said orifices, which can, by rotation of said member, be aligned with the conduits of said obturating means, to alternately and intermittently conduct air samples from each of said plenum chambers to each of said cavities.

21. An apparatus according to claim 12, wherein each of said cavities is made of material having a low thermal expansion coefficient and the interior of each of said cavities is coated with a material having high conductivity to provide said cavity with high Q-factors.

22. An apparatus for measuring the difference of the electromagnetic refractivity of two gases, comprising:

a first source and a second source for providing samples of the gas, said sources being vertically separated a known distance;

two resonant cavities for receiving samples of said gas, said cavities being tuned to different frequencies;

means for directing samples of gas from each of said sources to each of said cavities;

means for determining the difference frequency for each of said cavities, with gas samples from each of said sources; and processing means for determining the gradient of the refractive index for said gas for the separation distance of said sources.

* * * * *